United States Patent [19]
Paxton et al.

[11] 4,267,524
[45] May 12, 1981

[54] UNSTABLE OPTICAL RESONATOR WITH SELF-IMAGING APERTURE

[76] Inventors: Alan H. Paxton, 314 Cornell Dr., SE., Albuquerque, N. Mex. 87106; Theodore C. Salvi, 19 Garden Park Cir., Albuquerque, N. Mex. 87107

[21] Appl. No.: 18,693
[22] Filed: Mar. 8, 1979
[51] Int. Cl.³ ............................................. H01S 3/05
[52] U.S. Cl. ........................ 331/94.5 C; 331/94.5 D; 331/94.5 N
[58] Field of Search ...................... 331/94.5 C, 94.5 D; 356/350

[56] References Cited
U.S. PATENT DOCUMENTS

| | | | |
|---|---|---|---|
| 3,581,227 | 6/1971 | Podgorski | 356/350 |
| 4,126,381 | 11/1978 | Chodzko et al. | 331/94.5 C |

OTHER PUBLICATIONS

"Modes in Unstable Optical Resonators and Lens Waveguides", by Siegman et al., *IEEE Jou. Quant. Elect.*, vol. Q.E.-3, No. 4, (Apr.'67).

"Unstable Optical Resonator Loss Calculations Using the Proney Method", by Siegman, *Appl. Optics*, vol. 9, No. 12, pp. 2729-2736, (Dec.'70).

*Primary Examiner*—William L. Sikes
*Assistant Examiner*—León Scott
*Attorney, Agent, or Firm*—Donald J. Singer; Jacob N. Erlich

[57] ABSTRACT

An unstable optical resonator with self-imaging aperture having at least two reflecting surfaces and a primary outcoupling aperture in optical alignment with each other. In the resonator the result of a single round-trip propagation is to image the primary aperture at its own plane. The self-imaging condition is met when a pass through the resonator, starting at the outcoupling aperture, produces an infinite Fresnel number.

10 Claims, 5 Drawing Figures

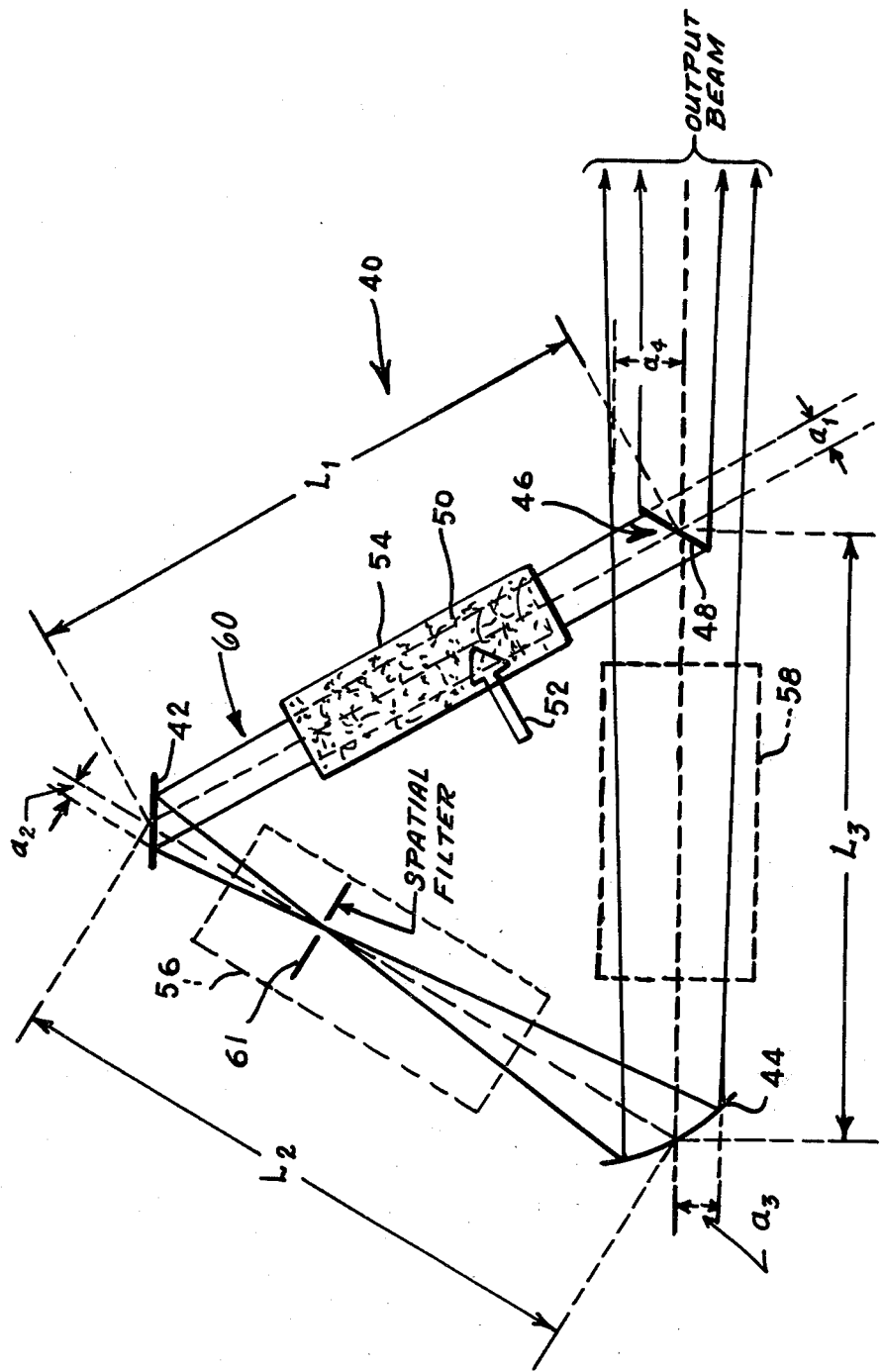

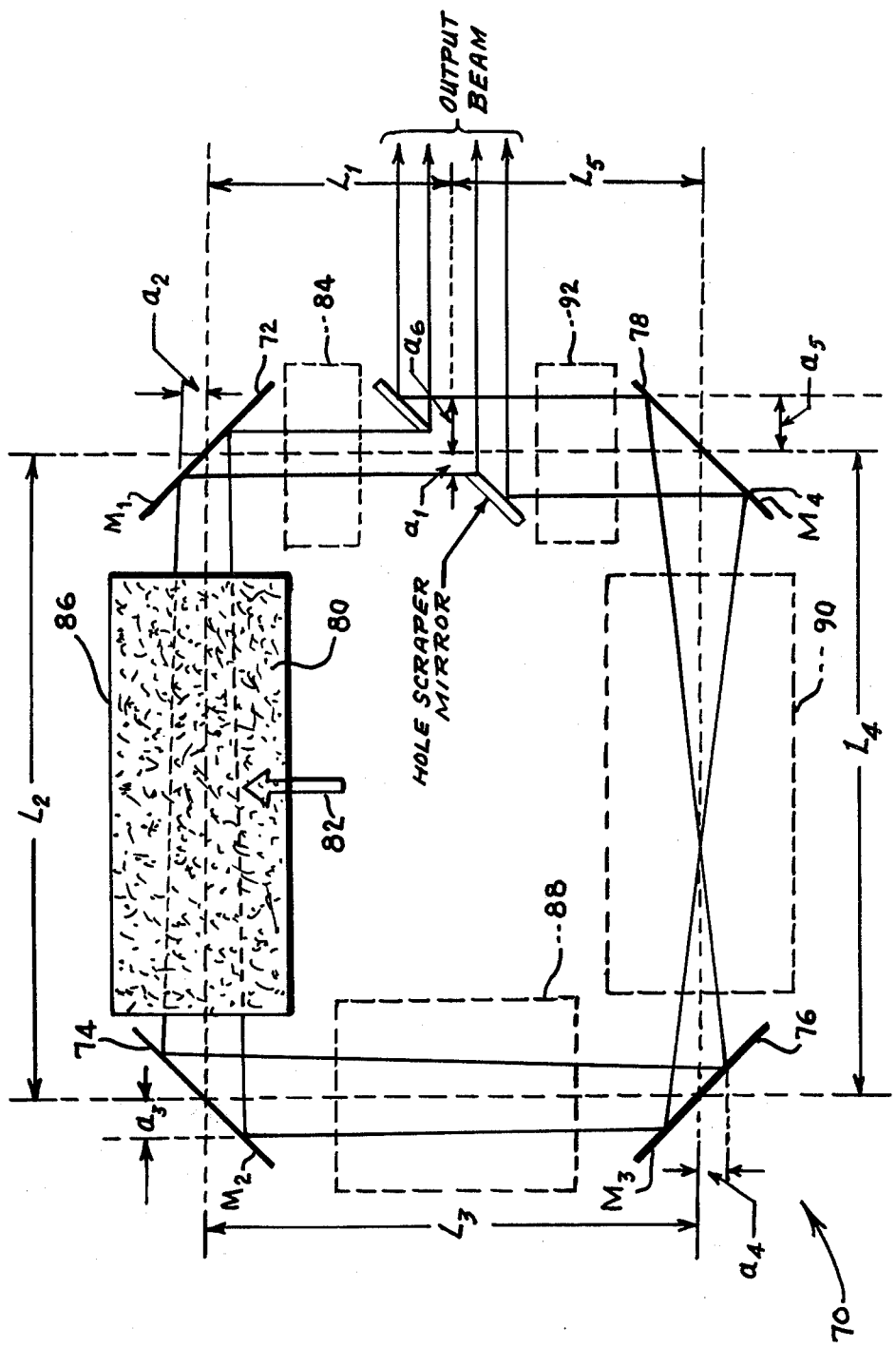

UNSTABLE OPTICAL RESONATOR WITH SELF-IMAGING APERTURE

STATEMENT OF GOVERNMENT INTEREST

The invention described herein may be manufactured and used by or for the Government for governmental purposes without the payment of any royalty thereon.

BACKGROUND OF THE INVENTION

This invention relates generally to lasers, and, more particularly to unstable optical resonators for use within a laser system in which the resonator has a self-imaging aperture.

The operation of a laser is based upon the fact that the atomic systems represented by the atoms of the laser medium can exist in any of a series of discrete energy levels or states, the systems absorbing energy in the optical frequency range in going to a higher state and omitting it when going to a lower state. The laser medium may be a solid, liquid or gas. In the case of a solid wherein a ruby is used as a laser material, three energy levels are utilized. The atomic systems are raised from the lower or ground level to the higher of the three levels by irradiation from, for example, a strong light source which need not be coherent but should preferably have a high concentration of energy in the absorbing wavelengths. A radiationless transition then occurs from the highest state to an intermediate or metastable state. This is followed by a transition with photo emission from the intermediate state back to the ground state. It is the last transition that is of interest since this transition is the source of the coherent light or electromagnetic energy produced by the laser.

The operation of raising the energy level of the laser material to produce the desired photo emission is referred to in the art as "pumping" and when more atoms reach an excited metastable state than remain in a lower energy level a "population inversion" is said to exist. The active medium in the laser is made optically resonant by placing reflectors or other optical devices, hereinafter referred to as the resonator of the laser, at the end thereof, forming the resonant chamber therebetween. The resultant laser beam escapes from the resonant chamber.

Generally, gas systems are preferred for high average power lasers. Gas lasers are conventionally arranged to have gas flow through the resonant cavity or gain region. Gas lasers are classified in accordance with the process by which the gas laser medium achieves the population inversion. Three conventional varieties of gas lasers are chemical lasers, electric discharge lasers and gas dynamic lasers. Chemical lasers achieve the population inversion by direct generation of higher energy vibrational states in the products of a chemical reaction. Electric discharge lasers achieve the population inversion by "pumping" the higher energy vibrational states in the media through the action of an electric current as in the manner set forth above with respect to the ruby laser. Gas dynamic lasers achieve the population inversion by reducing the population level of the lower energy vibrational state of a hot gas in thermal equilibrium through the rapid cooling caused by supersonic aerodynamic expansion.

Generally the resonators themselves are considered stable resonators, that is, resonators which lie in the stable region of the Fox and Li mode chart and have Gaussian normal modes, or with special limiting cases on the boundary of the stability region, such as the planar resonator. Today, however, the possible application of high power lasers are unlimited in the field of communication, manufacturing, construction, medicine, space exploration and defense and as a consequence thereof, research in this area is ever expanding.

As a result thereof unstable optical resonators now appear to be very useful as resonators for moderate to high gain, large mode volume, high power laser devices. The unstable optical resonators are those resonators which fall well into the unstable region of the Fox and Li mode chart. Although these resonators do not have large diffraction losses, the advantages of these resonators are that they have excellent transverse mode discrimination even at large Fresnel numbers, a large, easily controlled, and uniformly filled mode cross section and diffraction output coupling for high power applications. It is still desirable, however, if such an unstable resonator could improve its mode discrimination and beam quality, and cause the diffraction ripples which reduce local flux load on optical elements.

SUMMARY OF THE INVENTION

The instant invention overcomes the problems encountered in the past and set forth hereinabove by providing an unstable resonator having a self-imaging aperture, that is, the dominant or primary aperture of the resonator is imaged back upon itself by the specific optics of the resonant cavity.

The unstable optical resonator with self-imaging aperture of this invention is made up of any optical resonator in which the result of a single round-trip propagation is to image the primary aperture, that is, the hole scraper mirror or feedback mirror aperture, at its own plane. The image of the aperture is magnified by the round-trip propagation so the resonator is an unstable resonator. The outcoupling aperture of the resonator can take the form of either a feedback mirror or scraper mirror which will have a square, round, eliptical, rectangular, hexagonal or other shape projection on a plane perpendicular to the propagation direction of the beam. Such an arrangement will give the beam a square, round, etc. cross section.

The self-imaging condition of the unstable resonator of this invention is met when a pass through the resonator, starting at the outcoupling aperture, produces an infinite Fresnel number. The Fresnel number for each propagation leg of the resonator is defined as follows where the progagation leg of the resonator is the length in the resonator separating two optical elements, for example, mirrors, aperture or lenses:

$$F_i = \pm a_1 a_2 / \lambda L$$

where $a_1$ and $a_2$ are half the width of the geometric beam at the beginning and end of the propagation leg, $\lambda$ is the wavelength and L is the length of the leg. The minus sign is used only if there is a focus within the leg. The total Fresnel number is $F_t$ where $$1/F_t = \sum_i 1/F_i = 1/\infty = 0$$

for the self-imaging condition of the resonator of this invention. The beam curvature within the resonator is chosen such that a complete trip through the resonator leaves it unchanged.

It is therefore an object of this invention to provide an unstable resonator with self-imaging aperture having greatly improved mode discrimination.

It is another object of this invention to provide an unstable resonator with self-imaging aperture having improved beam quality.

It is a further object of this invention to provide an unstable resonator with self-imaging aperture which greatly reduces the diffraction ripples in, the output and feedback.

It is still a further object of this invention to provide an unstable resonator with self-imaging aperture which greatly reduces local flux loads on the optical elements of the resonator.

It is still a further object of this invention to provide an unstable resonator with self-imaging aperture which is economical to produce and which utilizes conventional, currently available components that lend themselves to standard mass producing manufacturing techniques.

For a better understanding of the present invention, together with other and further objects thereof, reference is made to the following description taken in conjunction with the accompanying drawing and its scope will be pointed out in the appended claims.

DETAILED DESCRIPTION OF THE DRAWING

FIG. 3 is a schematic illustration of the unstable ring resonator with self-imaging aperture of this invention having three propagation legs therein;

FIG. 4 is a schematic illustration of the unstable resonator with self-imaging aperture of this invention having four propagation legs therein.

DETAILED DESCRIPTION OF THE PREFERRED EMBODIMENT

The unstable resonator has been in existance for numerous years as evidenced by the following publication: Anan'ev, Y. A., Seentsitskaya, N. A., and Sherstabitov, V. E., "Properties of a Laser with an Unstable Resonator," *Zh. Eksp. Teor. Fiz.* 55, 130, 1968; Freiberg, R. J., Chenausky, P. P., and Buczek, C. J., "Unidirectional Unstable Ring Lasers," *Appl. Opt.* 12, 1140, 1973; and Freiberg, R. J., Chenausky, P. P., and Buczek, C. J., "Asymmetric Unstable Treveling-Wave Resonators," *IEEE J. Quantum Electron* QE-10, 279, 1974. Unfortunately, as pointed out in the Background of the Invention, unstable resonators of the past were deficient in many areas of operation.

The unstable optical resonator of this invention has bare cavity eigenmodes that differ radically from the usual unstable resonator eigenmodes as set forth in the prior art. By constructing the resonator of this invention such that the result of one round trip propagation is to image the aperture upon itself, primary diffraction effects are substantially eliminated. The resultant resonator has, therefore, an infinite equivalent collimated Fresnel number and a zero equivalent collimated length.

Figures 1, 5:
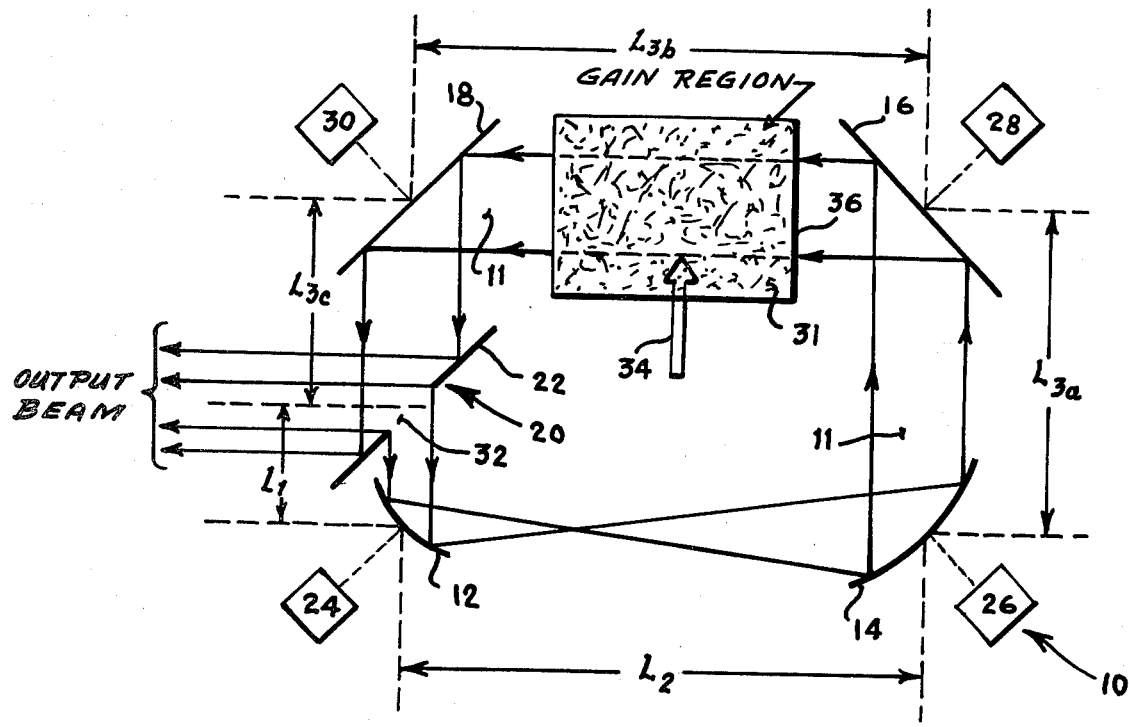
FIG. 1 is a schematic illustration of the unstable ring resonator with self-imaging aperture of this invention in which the beam is collimated everywhere except in the region which contains the focus.
FIG. 5 is a schematic illustration of the standing wave unstable resonator with self-imaging aperture of this invention.

For simplicity and a clear understanding of this invention reference is made initially to the embodiment of the unstable resonator 10 shown schematically in FIG. 1 of the drawing. Unstable resonator 10 is considered as a confocal negative branch unstable ring resonator in which the generated beam of radiant energy 11 is collimated everywhere except in the region which contains the forms. In this embodiment resonator 10 is made up of four optically aligned radiation directing elements in the form of reflective surfaces such as mirrors 12, 14, 16 and 18 and any suitable primary outcoupling aperture 20 in the form of, for example, a conventional scraper mirror 22.

Outcoupling aperture 20 and mirrors 12, 14, 16 and 18 are spaced apart preselected distances $L_1$, $L_2$, $L_{3a}$, $L_{3b}$ and $L_{3c}$, respectively, by means of any suitable moving means such as electric motors 24, 26, 28 and 30. It should further be noted it is well understood in the optic field that although primary outcoupling aperture 20 in the case of a conventional scraper mirror 22 as in FIG. 1 has an actual opening 32 formed therein, if a conventional feedback mirror or the like is utilized with this invention, the reflective portion of the feedback mirror constitutes primary aperture 20. The laser gain medium 31 and initiator 34, in the form of, for example, an electric discharge may be situated within gain region 36 in any part of the resonator 10 which is intersected by radiant energy beam 11.

The self-imaging condition for the unstable resonator 10 of this invention is met when a pass of beam 11 through resonator 10, starting at the outcoupling aperture 20, produces an infinite Fresnel number. In the specific instance of resonator 10 the condition for imaging is $$L_1 - \frac{L_2}{|M|} + \frac{L_3}{|M|^2} = 0 \qquad (1)$$

where M is the resonator magnification and $$L_3 = L_{3a} + L_{3b} + L_{3c}$$

With this condition met, the solution for resonator 10 of this invention becomes exactly the same as an approximation to resonators with diffraction effects neglected. With M negative to account for the negative branch, the strip resonator equation is $$\gamma \nu(x) = \frac{1}{|M|^{\frac{1}{2}}} \nu\left(\frac{x}{M}\right) \qquad (2)$$

The eigenmodes and eigenvalues of this equation are $$\nu_n(x) = x^n \qquad (3)$$
$$\gamma_n = \frac{M^{-n}}{|M|^{\frac{1}{2}}}$$

Negative values of n are not physical since they have a pole at x=0. Note that $\gamma_n$ decreases rapidly with increasing n for any M significantly greater than 1.

The equation and solution for resonators with a round aperture and spherical mirrors are $$\gamma v (r, \theta) = \frac{1}{|M|} v\left(\frac{r}{|M|}, \theta + \frac{\pi(M - |M|)}{2M}\right) \quad (4)$$

$$v_{nl}(r,\theta) = r^n \theta_l(\theta), \gamma_{nl} = \frac{M^l}{|M|^{l+n+1}} \quad (5)$$

where
$$\theta_l = e^{\pm il\theta}$$

The value of l does not affect the magnitude of the eigenvalue and is arbitrary except for n=0, in which case l must be zero since v(r, θ) is required to be single valued at the origin. The n=0 eigenmode will again dominate, as in the strip resonator case. One is therefore led to conclude that the self-imaging aperture resonator has a fundamental mode with uniform intensity and phase whether it has a square or round aperture. The transverse mode discrimination is also much greater than in conventional unstable resonators.

The idea of propagating from primary aperture 20 through resonator 10 with no diffraction effects as in this invention may seem unusual, so a further explanation is included. We can treat the entire cavity round-trip propagation, starting with beam 11 coming through opening 32 in scraper mirror 22 and ending with the scraper mirror 22, as one single equivalent collimated propagation. This assumes that no other limiting apertures are present. The propagation can be characterized by an equivalent collimated Fresnel number, $F_c$, or alternately by an equivalent collimated propagation length, $L_c$, assuming a fixed but somewhat arbitrary beam size. The self-imaging resonator 10 of this invention requires $F_c = \infty$ and $L_c = 0$. Equivalent collimated Fresnel numbers for each part of the resonator can be added reciprocally to yield $F_c$, or equivalent collimated propagation lengths can be added linearly to produce $L_c$. In order to satisfy the requirement that $F_c = \infty$ and $L_c = 0$, at least one negative Fresnel number propagation section (or equivalently, one negative equivalent collimated length) is required.

Figure 2:
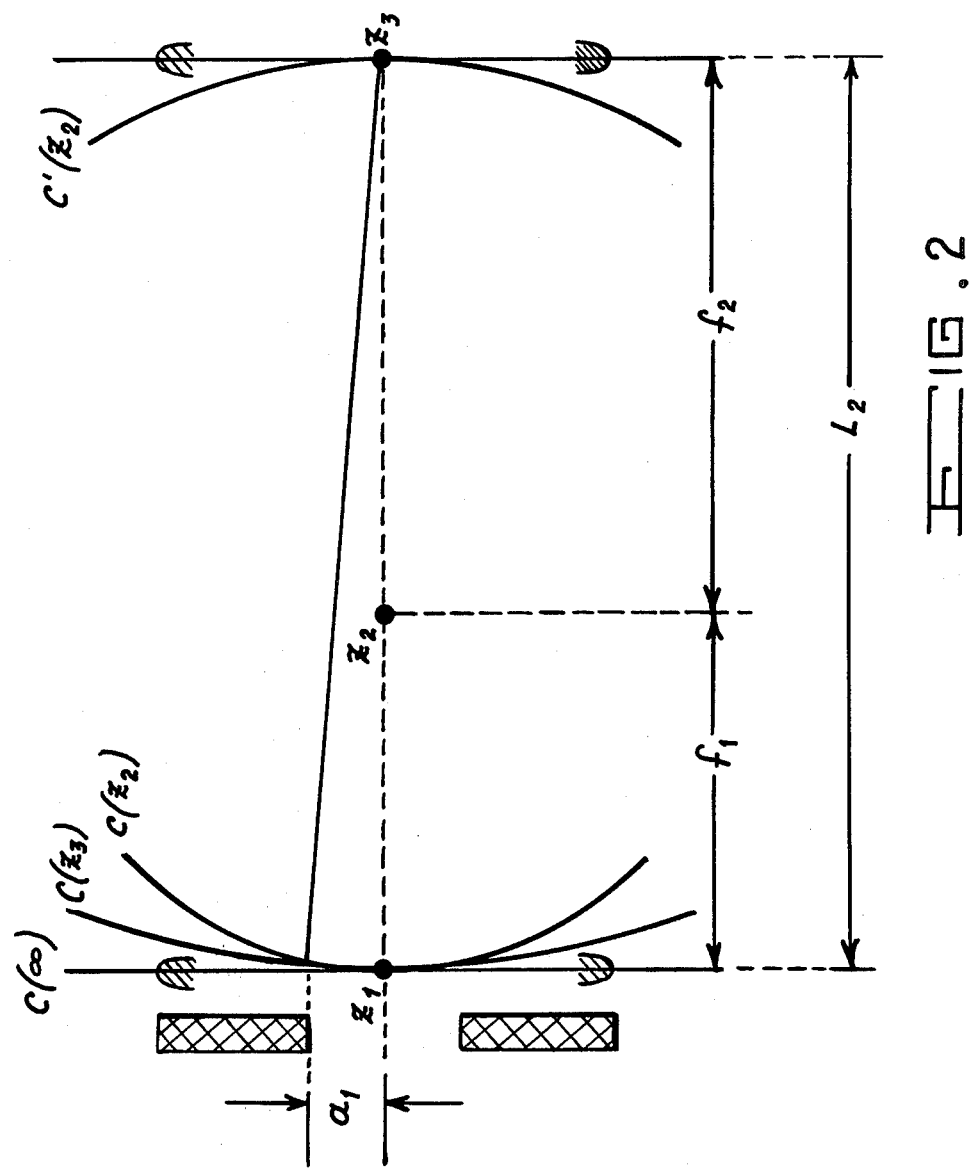
FIG. 2 is a schematic illustration of the equivalent collimated Fresnel number associated with a light beam passing through a focus in a Galilean telescope with magnification $M = -f_2/f_1$.

FIG. 2 of the drawing illustrates the equivalent collimated Fresnel number associated with a light beam passing through a focus in a Galilean telescope with magnification $M = -f_2 f_1$. In this figure, C (∞) represents a plane passing through $z_1$, while $C(z_3)$ is a spherical surface centered at $z_3$, and $C(z_2)$ is a spherical surface centered at $z_2$. The Fresnel number associated with a collimated beam propagating from $z_1$ to $z_3$ is $a_1^2/(\lambda L_2)$, twice the number of wavelengths between C (∞) and $C(z_3)$ at the geometric edge of the beam. In resonator 10 shown in FIG. 1 of the drawing, however, we are concerned with a beam with a geometric wavefront along $C(z_2)$ which propagates through a focus to arrive at $C(z_2)$. The edge of this wavefront is closer to $z_3$ than is its center, resulting in a negative equivalent collimated Fresnel number $N_{c2} = -a_1^2 |M|/(\lambda_2)$ and a negative equivalent collimated length $L_{c2} = -L_2/|M|$. The general formula for an equivalent collimated Fresnel number is $N_{c2} = a_1 a_2/(\lambda L_2)$, where $a_2 = Ma_1$, and $a_1$ and $a_2$ have opposite signs if the beam focuses between them. This explains why a negative branch resonator was selected for an infinite Fresnel number configuration. A positive branch resonator would require at least two real focuses to have zero effective length.

Several effects can perturb the geometrical nature of the solution set forth hereinabove. We have assumed a perfect imaging system with no aberrations. It is not sufficient to perfectly propagate the geometric beam as it traverses the cavity. Light is diffracted by opening 32 in scraper mirror 22, and all diffracted light must traverse the cavity without being disturbed in order to form a perfect image. The interaction of this diffraction with a saturable gain medium is one such perturbation which has not yet been studied. Other perturbations such as mirror misalignment, mirror figure error, medium inhomogeneity, and nonuniform gain transverse to the optic axis will also have a deleterious effect which has not been quantified.

In addition, generally asymptotic analyses of strip and round resonators have indicated that the transverse mode discrimination in unstable resonators decreases and that the modes acquire a finer structure as the equivalent Fresnel number increases. However, these asymptotic analyses do not apply in the instant invention because they assume a resonator with an equivalent collimated length much greater than its width. As $L_c$ becomes smaller and the equivalent Fresnel number becomes very large, there is a point where this assumption becomes invalid. In this region the modes will begin to approach the geometric modes.

Reference is now made to FIG. 3 of the drawing in which another embodiment of the invention is schematically illustrated as self-imaging ring resonator 40. Resonator 40 is made up of two elements in the form of mirrors 42 and 44 with the primary outcoupling aperture 46 being in the form of a conventional feedback mirror 48 in which the reflective portion thereof acts as the primary aperture 46. As with resonator 10, the laser gain medium 50 and initiator 52 may be located in any one or all of the gain regions 54, 56 and/or 58 intersected by the laser beam 60. In addition, the distances $L_1$, $L_2$ and $L_3$ may be altered by any suitable moving means such as electric motors (not shown).

For resonator 40 of this invention the self-imaging condition is $$L_1/(a_1 a_2) - L_2/(a_2 a_3) + L_3/(a_3 a_4) = 0 \quad (6)$$

where $a_1$, $a_2$, $a_3$ and $a_4$ are half the width of the geometric beam sizes at the resonator mirrors and aperture, respectively. Mirrors 42 and 44 may be flat or have spherical or off-axis parabolic curvature. The lengths, $L_i$, and the beam sizes, $a_i$, can be used to determine the radii of curvature of mirrors 42 and 44. It should be noted that the combination of a lens and a flat mirror may also be used to replace any spherical or parabolic mirror. A spatial filter 61 would probably be included at the internal focus of the beam in order to suppress the reverse mode. The outcoupling of light from resonator 40 takes place around the primary aperture or feedback mirror 48.

As stated hereinabove a scraper mirror such as shown in FIG. 1 may replace feedback mirror 48. In addition Equation (6) may be modified to apply to a resonator with more mirrors. It is also possible for the generated beam to have more than one focus within the resonator 40 of this invention. Equation 6 can be generalized by including more terms of the form $L_i/(a_i a_j)$ if there are more mirrors in the cavity. A term will be added if the beam does not focus between the two mirrors which bound the additional resonator segment and will be subtracted if the beam focuses between the two mirrors which bound the segment.

For example, FIG. 4 of the drawing schematically illustrates a resonator 70 with additional mirrors. Mirrors 72, 74, 76 and 78 may be spherical, parabolic, or flat mirrors. The gain medium 80 and initiator 82 as set forth above may be located in any or all of the regions 84, 86, 88, 90 and 92. The condition for self-imaging of resonator 50 of this invention is $$L_1/(a_1a_2)+L_2/(a_2a_3)+L_3/(a_3a_4)-L_4/(a_4a_5)+L_5/(a_5a_6)=0 \quad (7)$$

In addition, the embodiment of this invention shown in FIG. 5 of the drawing schematically represents a standing wave unstable resonator 100. In resonator 100 reflecting elements 102 and 104 are disposed on opposite sides of the primary aperture 106. Any suitable gain medium 108 can be located in any gain region 110 which the beam traversed within resonator 100. The self-imaging condition for resonator 100 is:

$$L_1/(a_1a_2)+L_2(a_3a_4)-(L_1+L_2)/(a_1a_3)=0 \quad (8)$$

One can also construct a standing wave self-imaging resonator with a collimated output without the scope of this invention by setting $a_1=a_2$ and $a_3=a_4$ in the embodiment shown in FIG. 5.

$$L_2 = ML_1$$
$$M = a_4/a_2 \quad (9)$$

with M the resonator magnification. In this instance the primary aperture 106 is located at the plane of the focus.

It is therefore quite evident from the analysis presented hereinabove that the self-imaging condition for unstable resonators, in general, is met when a pass through the resonator, starting at the outcoupling aperture, produces an infinite Fresnel number. The Fresnel number for each propagation leg of the resonator can be defined as:

$$F_i = \pm \frac{a_1 a_2}{\lambda L}$$

where $a_1$ and $a_2$ are half the width of the geometric beam at the beginning and end of a propagation leg, $\lambda$ is the wavelength, and L is the length of the leg. The minus sign is used only if there is a focus within the leg. A propagation leg is the length in the resonator separating two optical elements, (eg. mirrors, the aperture, lenses). The total Fresnel number is $F_t$, where $$1/F_t = \sum_i 1/F_i = 1/\infty = 0$$

for self-imaging. The beam curvature is chosen such that a complete trip through the resonator leaves it unchanged.

Although this invention has been described with reference to particular embodiments, it will be understood to those skilled in the art that this invention is also capable of further and other embodiments within the spirit and scope of the appended claims.

We claim:

1. In a laser system having at least one gain region, a laser medium located within said gain region, and means for initiating a laser action within said medium thereby emitting a beam of coherent radiant energy, the improvement comprising means forming an unstable resonator for said laser system having a self-imaging aperture, said unstable resonator comprising at least two means in optical alignment with each other and said gain medium for directing said beam of radiant energy therebetween, means forming said aperture of said resonator in optical alignment with said directing means for outputting a portion of said beam of radiant energy from said laser system and feeding back the remainder of said beam of radiant energy to said pair of directing means, said pair of directing means and said outputting and feedback aperture means being spaced apart a predetermined distance from each other, respectively, thereby forming at least two propagation legs of said resonator therebetween and a self-imaging condition for said resonator being met when a single round trip pass of said radiant beam of energy through said resonator starting at said outputting and feedback aperture means produces an infinite Fresnel number, said Fresnel number for each of said propagation legs of said resonator being defined as $F_i=\pm a_1a_2/\lambda L$ where $a_1$ and $a_2$ are half the width of a geometric beam of radiant energy at the beginning and end of one of said propagation legs, $\lambda$ is the wavelength and L is the length of each of said propagation legs, the total Fresnel number of said self-imaging condition being $F_t$ where $1F_t=\Sigma 1/F_i=1/\infty=0$.

2. In a laser system as defined in claim 1 wherein said directing means and said outputting aperture means form a substantially triangular optical configuration therebetween and said self-imaging condition fulfills the requirement that $$L_1(a_1a_2)-L_2/(a_2a_3)+L_3/(a_3a_4)=0$$

where $L_1$, $L_2$ and $L_3$ are said predetermined distances between said directing means and said aperture means, respectively, and $a_1$, $a_2$, $a_3$ and $a_4$ are half the width of said geometric beam of radiant energy at each of said directing means and said aperture means, respectively.

3. In a laser system as defined in claim 1 wherein there are four of said directing means and said self-imaging condition fulfills the requirement that $L_1/(a_1a_2)+L_2/(a_2a_3)+L_3/(a_3a_4)-L_4/(a_4a_5)+L_5/(a_5a_6)=0$ where $L_1$, $L_2$, $L_3$, $L_4$ and $L_5$ are said predetermined distances between said directing means and said aperture means, respectively, and $a_1$, $a_2$, $a_3$, $a_4$, $a_5$ and $a_6$ are half the width of said geometric beam of radiant energy at each of said directing means and said aperture means, respectively.

4. In a laser system as defined in claim 1 wherein said unstable resonator is a standing wave unstable resonator and said self-imaging condition fulfills the requirement that $L_1/(a_1a_2)+L_2/(a_3a_4)-(L_1+L_2)/a_1a_3=0$ where $L_1$, $L_2$, and $L_3$ are said predetermined distances between said directing means and said aperture means, respectively, and $a_1$, $a_2$, $a_3$, and $a_4$ are half the width of said geometric beam of radiant energy at each of said directing means and said aperture means, respectively.

5. In a laser system as defined in claim 4 wherein said directing means are disposed on opposite sides of said aperture means.

6. In a laser system as defined in claim 1 further comprising means connected to said directing means for moving said directing means with respect to each other.

7. In a laser system as defined in claim 7 wherein said aperture means comprises a feedback mirror.

8. In a laser system as defined in claim 1 wherein said aperture means comprises a scraper mirror.

9. In a laser system as defined in claim 7 further comprising means connected to said directing means for moving said directing means with respect to each other.

10. In a laser system as defined in claim 8 further comprising means connected to said directing means for moving said directing means with respect to each other.

* * * * *